United States Patent
Chandrasekharan et al.

(10) Patent No.: US 9,477,005 B2
(45) Date of Patent: Oct. 25, 2016

(54) METHOD FOR OBTAINING INFORMATION SIGNATURES FROM NUCLEAR MATERIAL OR ABOUT THE PRESENCE, THE NATURE AND/OR THE SHIELDING OF A NUCLEAR MATERIAL AND MEASUREMENT SETUP FOR PERFORMING SUCH METHOD

(75) Inventors: Rico Chandrasekharan, Zurich (CH); Giovanna Davatz, Zurich (CH); Ulisse Gendotti, Zurich (CH); David Murer, Zurich (CH)

(73) Assignee: Arktis Radiation Detectors Ltd, Zurich (CH)

( * ) Notice: Subject to any disclaimer, the term of this patent is extended or adjusted under 35 U.S.C. 154(b) by 60 days.

(21) Appl. No.: 14/350,485

(22) PCT Filed: Nov. 7, 2011

(86) PCT No.: PCT/EP2011/069570
§ 371 (c)(1),
(2), (4) Date: Apr. 8, 2014

(87) PCT Pub. No.: WO2013/068032
PCT Pub. Date: May 16, 2013

(65) Prior Publication Data
US 2014/0264058 A1 Sep. 18, 2014

(51) Int. Cl.
*G01V 5/00* (2006.01)
*G01T 1/167* (2006.01)
(Continued)

(52) U.S. Cl.
CPC ............. *G01V 5/0091* (2013.01); *G01T 1/167* (2013.01); *G01T 3/00* (2013.01); *G01T 3/06* (2013.01); *G01V 5/0075* (2013.01)

(58) Field of Classification Search
CPC .... G01V 5/0075; G01V 5/0091; G01T 3/06; G01T 1/167; G01T 3/00

USPC .................................................. 250/391, 394
See application file for complete search history.

(56) References Cited

U.S. PATENT DOCUMENTS

| 2005/0029460 A1 | 2/2005 | Iwatschenko-Borho et al. |
| 2005/0105665 A1* | 5/2005 | Grodzins et al. ............. 376/157 |

(Continued)

FOREIGN PATENT DOCUMENTS

| WO | 2010035003 A2 | 4/2010 |
| WO | WO 2011160690 A1 * | 12/2011 |

OTHER PUBLICATIONS

Chandra et at., Gamma-Insensitive Fast Neutron Detector with Spectral Source Identification Potential, Homeland Security Affairs, Mar. 2011, 1-8, Supplement 3.

(Continued)

*Primary Examiner* — Mark R Gaworecki
(74) *Attorney, Agent, or Firm* — The Webb Law Firm

(57) ABSTRACT

The invention relates to a method for obtaining information or signatures about the presence or the nature of a nuclear radiation source, especially in a homeland security application, said nuclear radiation source emitting in a time or angle correlated manner at least a first radiation and a second radiation. The method includes the steps of detecting said first radiation with at least one first radiation detector and detecting said second radiation with at least one second radiation detector. The detection of said second radiation is triggered by said detection of said first radiation in a manner that is adapted to the radiation's correlation structure, thereby increasing the signal-to-background ratio for the detection of said second radiation.

29 Claims, 6 Drawing Sheets

(51) Int. Cl.
*G01T 3/00* (2006.01)
*G01T 3/06* (2006.01)

(56) References Cited

U.S. PATENT DOCUMENTS

2005/0105681 A1 5/2005 Kang et al.
2008/0048872 A1 2/2008 Frank
2009/0294686 A1 12/2009 Chandrasekharan
2012/0155592 A1* 6/2012 Gozani et al. ................ 376/154

OTHER PUBLICATIONS

Mitchell et al., Neutron Detection With Gamma-Ray Spectrometers for Border Security Applications, IEEE Transactions on Nuclear Science, Aug. 2010, 2215-2219, vol. 57, No. 4.

* cited by examiner

METHOD FOR OBTAINING INFORMATION SIGNATURES FROM NUCLEAR MATERIAL OR ABOUT THE PRESENCE, THE NATURE AND/OR THE SHIELDING OF A NUCLEAR MATERIAL AND MEASUREMENT SETUP FOR PERFORMING SUCH METHOD

BACKGROUND OF THE INVENTION

1. Field of the Invention

The present invention relates to the technologies used especially in homeland security or nuclear safeguard applications, e.g. where security relevant nuclear, radiating materials passing the border must be detected and/or characterized. It refers to a method for obtaining information signatures from nuclear material or about the presence, the nature and/or the shielding of a nuclear material.

It further refers to a measurement setup for performing such a method.

2. Description of Related Art

The capability of detecting special nuclear materials (SNM) is of importance in the context of preventing and deterring misuse of nuclear material. In particular at ports of entry, there is an interest to prevent such material from being illicitly brought into a country. For this purpose radiation detectors of different form factors can be used, including large, vehicle-sized radiation portal monitors (RPM, see FIG. 3). The following description uses RPMs as an example, analogous principles apply equally for other radiation detectors such as for example handheld or portable devices.

RPMs are effective at detecting radiological materials suitable for misuse in a radiological dispersal device (RDD), for example a dirty bomb. This is not surprising, since a substantial amount of radioactivity is required for such a device to have its desired effect, the high level of radioactivity typically giving a clear signature of gamma radiation.

The detection of SNM is complicated by the fact that SNM is not highly radioactive. Depending on its nature, SNM can in some (but not all cases) emit substantial amounts of neutron and/or gamma radiation. Even so, the intensity of radiation emitted may be low compared to other backgrounds, including natural backgrounds or benign sources such as naturally occurring radioactive materials (NORM). In cases where SNM is additionally shielded by neutron or gamma shielding, the detection problem becomes very difficult to solve.

Typically, RPMs deployed with the intention of interdicting SNM aim at detecting both neutron and gamma radiation signatures from fission: Neutron signatures are detected using thermal neutron detectors surrounded by moderating material; gamma signatures are detected by scintillation detectors such as polyvinyltholuene (PVT). Faced with the challenge of detecting weak radiation signatures characteristic of fission in the presence of strong backgrounds, RPMs have so far not been able to deliver high SNM detection capabilities without incurring unacceptably high 'nuisance alarm' rates caused by legitimate NORM sources in commerce.

In an attempt to improve detection probability and reduce nuisance alarm rates, PVT scintillators were replaced by higher resolution gamma detectors such as sodium iodide (NaI) scintillation crystals or high purity germanium detectors. In field trials, RPMs based on these technologies were not capable of demonstrating a substantial improvement in achieving the goals set out.

SUMMARY OF THE INVENTION

It is an object of this invention to provide a method to detect SNM with high probability without the burden of an increase of false positives, and a measurement setup to do so with a SNM detection probability higher than that of typical RPMs while at the same time having a lower susceptibility to nuisance alarms.

It is a further object of the invention to provide a measurement setup for performing such a method The present invention refers to the following prior art techniques:

It was found that, unlike the conventional approach to detect neutrons using thermal neutron detectors inside moderators, neutron radiation can be detected with comparable efficiency indirectly using gamma detectors tuned to the gamma energy range from 3-8 MeV (see: D. J. Mitchell et al., Neutron Detection With Gamma-Ray Spectrometers for Border Security Applications, IEEE Trans. Nucl. Science, Vol. 57, No. 4, August 2010). This approach contains two new insights: First, that the gamma radiation background in this energy range is sufficiently low to search for weak radiation signatures. Second, that a large variety of processes contributing to gamma radiation signatures detectable with a gamma detector had previously been unexploited for SNM detection.

A nuclear material or radiation source 11 emits fission-related neutrons which generate gamma radiation by various mechanisms, said gamma radiation ($\Gamma$) being measured by a radiation detector, which is connected to a detector electronics within a measurement setup:

1. Gamma radiation emitted in a radiative capture, inelastic scattering, or similar process involving a thermalized or fast fission neutron in a material shielding the source;

2. Gamma radiation emitted in a radiative capture, inelastic scattering, or similar process involving a thermalized or fast fission neutron in surroundings, such as a container or detector wall, or a surface;

3. Gamma radiation emitted in radiative capture, inelastic scattering or similar process involving a thermalized or fast fission neutron in dedicated materials surrounding the gamma detector, e.g. as part of a detector enclosure;

4. Gamma radiation emitted in a radiative capture, inelastic scattering, or similar process involving a thermalized or fast fission neutron in the gamma detector itself;

5. Fast neutron scattering in the detector D-mimicking a gamma signature; and

6. Radiation emitted as a consequence of self-induced fission in the nuclear material or source.

These processes lead to a gamma signature that is substantially more intense than expected on the grounds of the gamma emission in the fission continuum alone.

Studying the technique mentioned above leads to the recognition that fission is accompanied by a larger quantity and variety of detectable signatures than merely direct fission signatures (neutron n6 and F, or a directly emitted gamma not shown in the Figures). Further study suggests that this entire palette of signatures must be correlated in time, following a predictable time structure. It is a subject of the invention to exploit this correlation to substantially suppress background and thereby boost the probably of detecting shielded SNM.

According to the invention, a method for obtaining information signatures from nuclear material or about the presence, the nature and/or the shielding of a nuclear material, especially in homeland security or nuclear safeguard applications, said nuclear material emitting in a time or angle correlated manner at least a first radiation and a second radiation, comprises the steps of detecting said first radiation by means of at least one first radiation detector and detecting said second radiation by means of at least one second radiation detector, whereby the detection of said second radiation is triggered by said detection of said first radiation in a manner that is adapted to the radiation's correlation structure, thereby increasing the signal-to-background ratio for the detection of said second radiation.

According to an embodiment of the inventive method said first radiation detector detects low background fission signatures consisting of radiation of comparatively low abundance except in the presence of nuclear material, and said second radiation detector detects any fission signatures directly or indirectly associated with nuclear material possibly difficult to use otherwise for characterization due to the presence of an intense background.

According to another embodiment of the inventive method said first radiation detector detects neutron radiation or high energy gamma radiation of a typical energy between 3 MeV and 9 MeV, and said second radiation detector detects gamma or x-ray radiation including radiation energy below 3.5 MeV.

According to another embodiment of the inventive method said first radiation detector is of a design that minimizes unintended triggers of said second radiation detector, achieved by maximizing said first radiation detector's sensitivity to said low background fission signatures, and minimizing said first radiation detector's sensitivity to background.

According to another embodiment of the inventive method said first radiation detector is relatively insensitive to photons of an energy below 3 MeV.

According to another embodiment of the inventive method said first radiation detector is a gas-based detector using a gas with low mass and low number of electrons, thereby making it insensitive to photons while being sensitive to neutrons.

According to another embodiment of the inventive method said first radiation detector uses He-4 as said gas.

According to another embodiment of the inventive method said first radiation detector detects low background fission signatures consisting of radiation resulting directly from fission or indirectly through neutron capture, or inelastic scattering, or fission processes in a material within range of fission neutrons from said nuclear material.

According to another embodiment of the inventive method said second radiation detector detects gamma or x-ray radiation emitted directly by fission or in indirect processes as a consequence thereof.

According to another embodiment of the inventive method said first radiation detector detects single events, and the detection events of said first radiation detector define one or more predetermined time windows, the data being acquired by one or more second radiation detectors within said predetermined time windows being analyzed separately from data acquired by said second radiation detector outside said time window.

According to another embodiment of the inventive method at least one of said predetermined time windows opens at a start time of the order of hundreds of nanoseconds prior to the triggering event detected by said first radiation detector, and the data being acquired by said second radiation detector are delayed accordingly.

According to another embodiment of the inventive method said first radiation detector is a fast neutron detector and said second radiation detector is a gamma detector.

According to another embodiment of the inventive method at least one of said predetermined time windows opens at a start time of the order of tens of nanoseconds prior to the triggering event detected by said first radiation detector, and the data being acquired by said second radiation detector are delayed accordingly.

According to another embodiment of the inventive method said first and second radiation detectors are both either fast neutron or gamma detectors, or at least one of said first and second radiation detectors serves in a dual function.

According to another embodiment of the inventive method at least one of said predetermined time windows opens at a start time of the order of a hundred microseconds prior to the triggering event detected by said first radiation detector, and the data being acquired by said second radiation detector are delayed accordingly.

According to just another embodiment of the inventive method at least one of said predetermined time windows closes at an end time of the order of hundreds of microseconds after the triggering event detected by said first radiation detector, to allow for the thermalization of neutrons thereby increasing the sensitivity to gammas and neutrons from induced events such as induced fission or (n, gamma) reactions.

According to another embodiment of the inventive method the length of said predetermined time windows is adapted in case of high count rates of the radiation detectors or in order to optimize the signal-to-noise ratio.

According to another embodiment of the inventive method the predetermined time windows are adjusted to account for other time correlation structures of physical processes creating the signatures, or physical processes involved in detecting said signatures.

According to another embodiment of the inventive method data acquired during said predetermined time windows is used to detect the presence of or characterize special nuclear material (SNM).

According to a further embodiment of the inventive method said second radiation detector is a thermal neutron detector exploiting the neutron capture of materials, especially He-3, Li-6, or B-10, or a detector for neutrons or gamma radiation, especially a PVT, or a liquid scintillator, or a scintillation crystal, preferably NaI, or a solid state detector.

According to another embodiment of the inventive method said nuclear material is activated to emit said correlated radiation by neutrons, photons, muons or protons from an internal or external source as part of an interrogation process.

The measurement setup according to the invention comprises at least a first radiation detector for detecting a first radiation emitted by a nuclear radiation source, and at least a second radiation detector for detecting a second radiation emitted by said nuclear radiation source in a time or angle correlated manner with said first radiation, wherein said first radiation detector is connected to said second radiation detector in a triggering relation.

According to an embodiment of the invention said first and second detectors are each connected to a measuring unit.

According to another embodiment of the invention a signal delay unit is provided between said second radiation detector and said measuring unit.

According to an embodiment of the invention said first radiation detector is a fast neutron detector and said second radiation detector is a gamma detector.

According to an embodiment of the invention said first radiation detector is a gas-based detector with the capability of rejecting events caused by gamma radiation and/or with a low mass and low number of electrons, thereby making it insensitive to photons while being sensitive to neutrons.

Especially, said first radiation detector uses He-4 as said gas.

An example of a well-suited detector for this application is described in document US 2009294686 A1, the disclosure of which is included in this application. Such detectors can be operated in a way to maximize the sensitivity for fast neutron detection while minimizing the sensitivity to abundant low energy gamma radiation backgrounds (see for example Chandra, Rico et al. "Gamma-Insensitive Fast Neutron Detector with Spectral Source Identification Potential." Homeland Security Affairs, Supplement no. 3 (2011)).

According to an embodiment of the invention said second radiation detector is part of a radiation portal monitor for monitoring pedestrians and/or vehicles and/or containers.

According to an embodiment of the invention said first radiation detector is hand-held or otherwise maneuverable to an area of interest.

BRIEF DESCRIPTION OF THE DRAWINGS

The present invention is now to be explained more closely by means of different embodiments and with reference to the attached drawings.

DETAILED DESCRIPTION OF DIFFERENT EMBODIMENTS OF THE INVENTION

Figure 1:
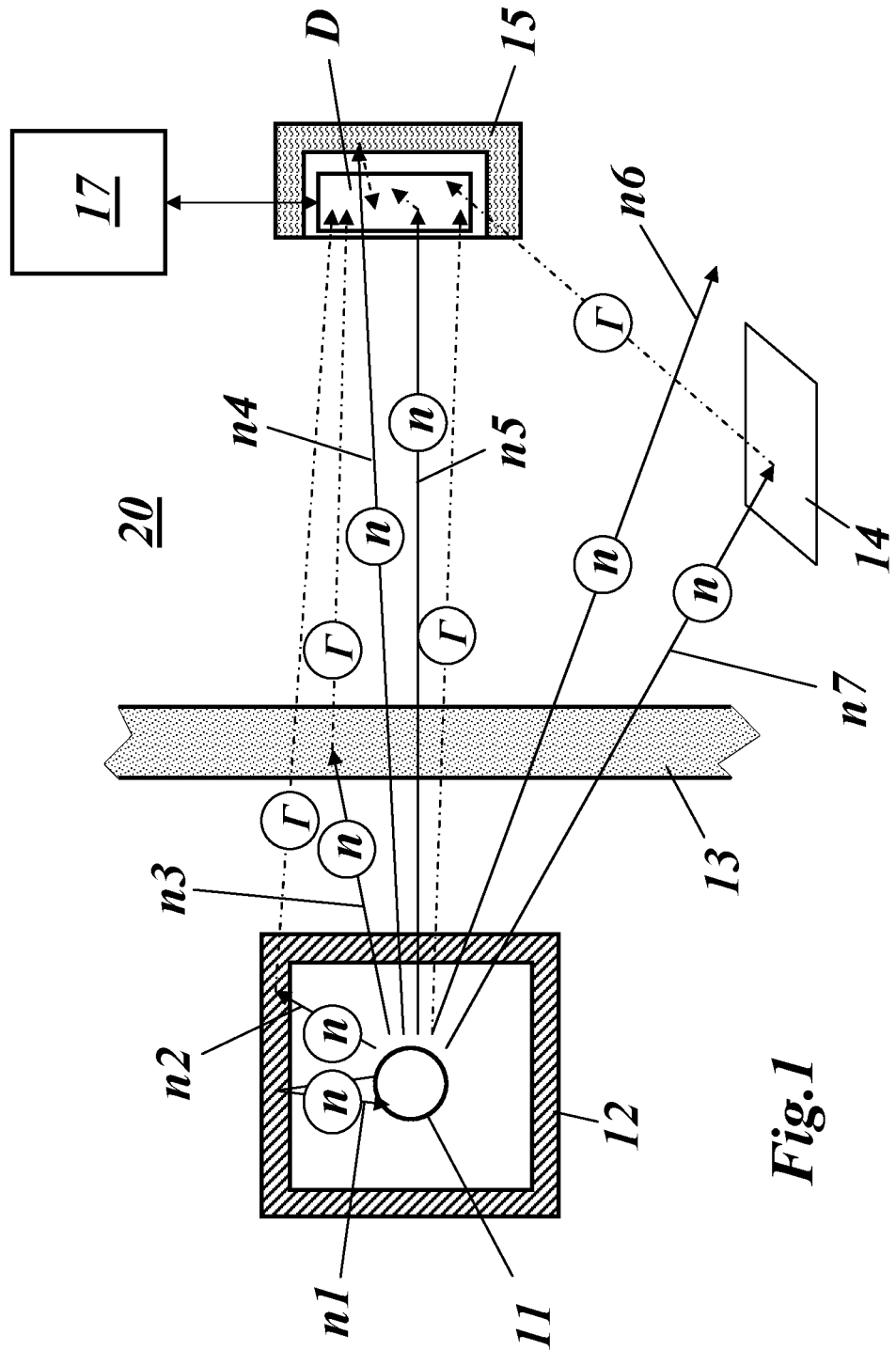
FIG. 1 shows a schematic diagram of a nuclear radiation source emitting fission-related neutrons generating a signature of gamma rays based on various processes, which are detected by a gamma detector.
Figure 2:
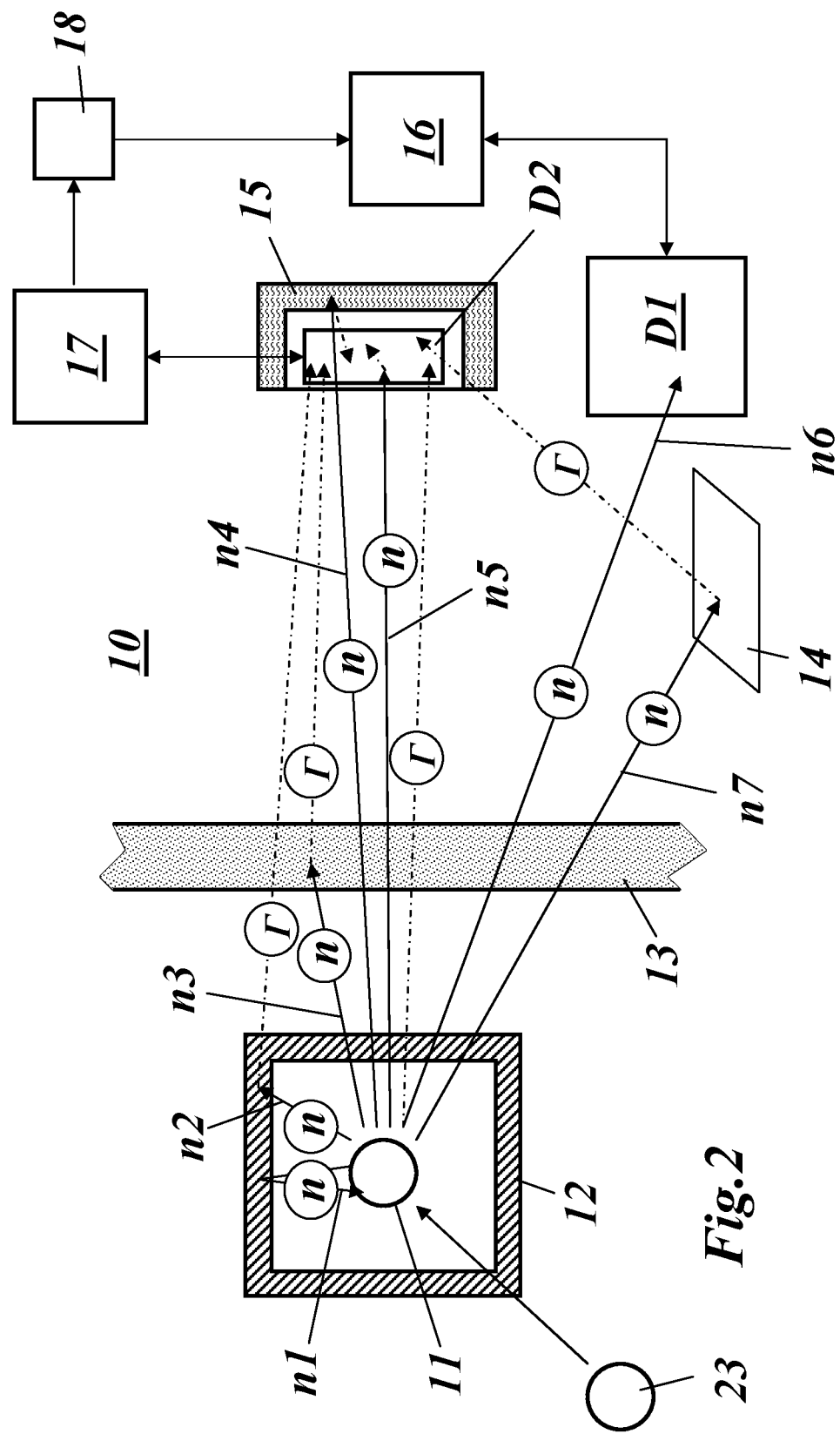
FIG. 2 shows, in a diagram similar to FIG. 1, a measurement setup according to an embodiment of the present invention.

FIG. 2 shows, in a diagram similar to FIG. 1, a measurement setup according to an embodiment of the present invention. The measurement setup 10 comprises a nuclear material or radiation source 11 shielded by a source shielding 12. The source 11 emits exemplary fission-related neutrons n1, . . . , n7, whereby neutron n1 is scattered back to the source 11 inducing fission and generating direct gamma radiation, neutron n2 is captured by the source shielding 12 to emit gamma radiation from there, neutron n3 is captured by the material of a surrounding 13, like a container or detector wall, etc. The same is true for neutron n7 striking a surface 14. Neutron n4 is captured by the material of a detector enclosure 15, neutron n5 generates gamma radiation directly within a second (gamma) detector D2 of the measurement setup 10.

In accordance with the invention, a first (in this embodiment fast neutron) detector D1 detects a neutron n6, which is emitted by the source 11 without suffering capture processes. The first detector D1 is connected to a measuring unit 16. The second detector D2 is connected to said measuring unit 16 via the detector electronics 17 and a delay unit 18. The gamma events detected by second detector D2 are delayed in said delay unit 18 to cope with the differences between neutron flight time and propagation of gamma radiation.

Figure 3:
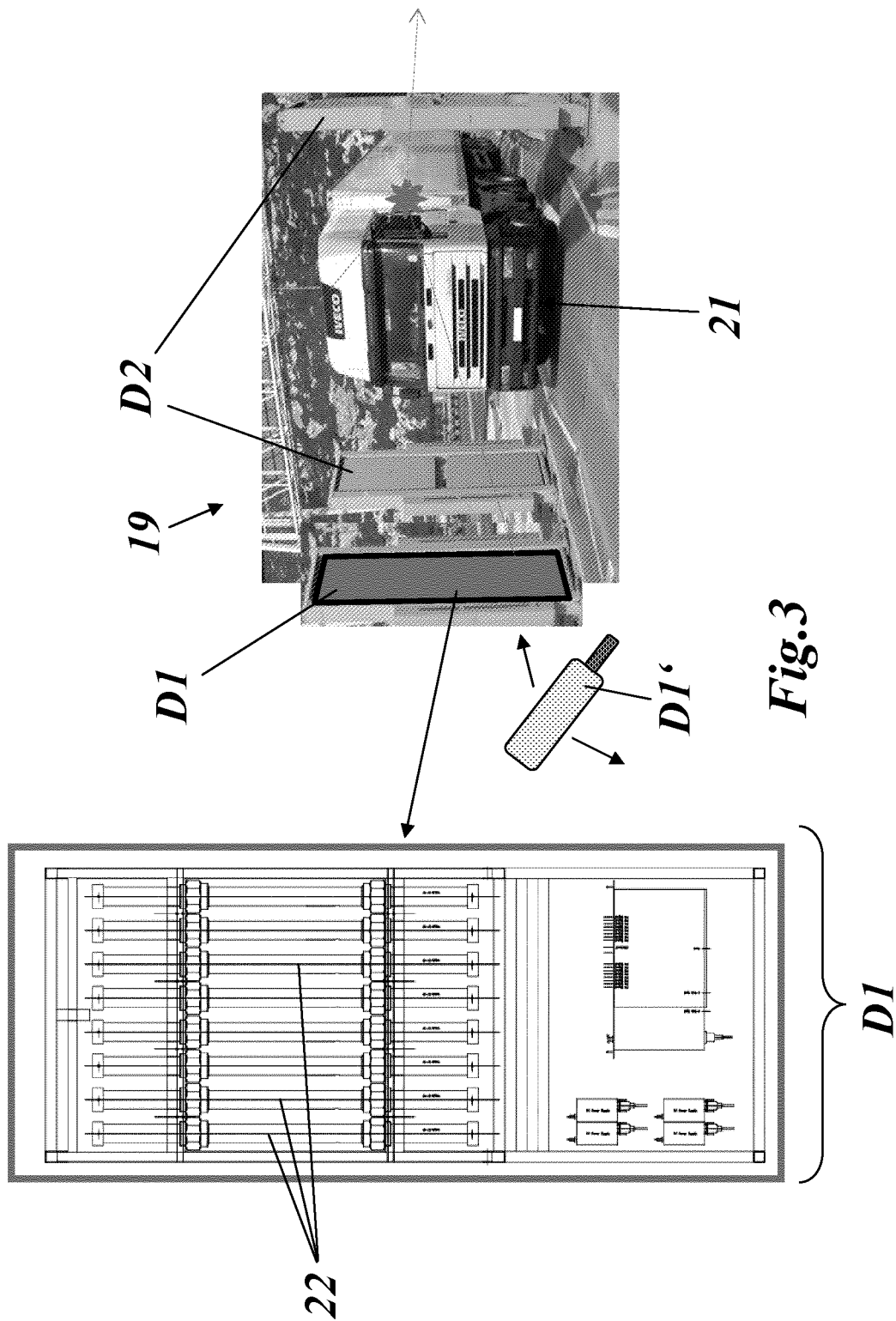
FIG. 3 shows another embodiment of the invention, whereby a standard radiation portal monitor (RPM) has been upgraded with a trigger panel consisting of He-4 scintillation detectors, which are sensitive to fast neutrons from fission, such that upon detection of a fast neutron, the RPM is read out.

FIG. 3 shows an embodiment of this invention, whereby a standard RPM 19 with second detectors D2 has been upgraded with an external trigger panel comprising a first detector D1, which may be either a stationary one, or may be hand-held (detector D1') or otherwise maneuverable. The original RPM 19 contains thermal neutron detectors, as well as gamma detectors based on NaI or PVT scintillation. Without the additional trigger panel, the RPM 19 is an effective tool to detect RDDs and similar radiological threats, but faces a challenge when required to detect shielded SNM as a source without causing unacceptably high nuisance alarm rates. In order to improve this situation, the RPM 19 has been upgraded with external trigger panels and appropriate signal acquisition, processing and triggering electronics and algorithms connected to the detectors of the RPM 19 and the triggering panel. In this embodiment, the triggering panel consists of pressurized He-4 scintillation detector tubes 22 with a high sensitivity for fast neutrons and a low sensitivity for low energy gammas.

The detection of a fast neutron emitted in a fission process in SNM transported through the portal 19 implies a) the fission source is within range of the detectors 22 and detectors 19 due to the proximity of the above. Therefore the signal to background ration detected is favorable due to proximity of the detectors to the SNM. b) a number of correlated direct and indirect fission signatures are present in a time window starting roughly 100 ns prior to the detection of the triggering fast neutron and lasting roughly 100 μs, possibly even ms after the detection of such neutron. By evaluating the output of the radiation detectors in this time window, the signal is substantially enhanced relative to the otherwise dominating backgrounds.

Figure 5:
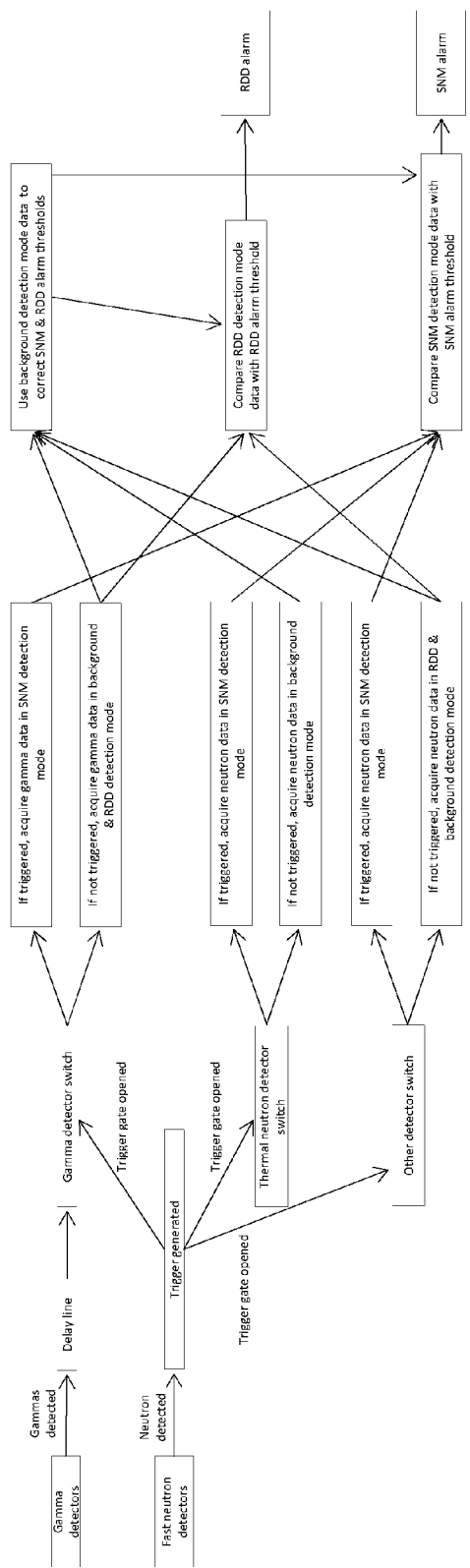
FIG. 5 shows a flow diagram of the steps involved in an embodiment of the invention.

FIG. 5 shows a flow chart of the processes taking place in an embodiment of the invention, for example in the embodiment described in FIG. 2. Data coming from gamma radiation detectors D2 in the embodiment are delayed by a few 100 ns by means of a delay unit (delay line) 18. This delay ensures the detection of fission gammas released nearly simultaneously as the triggering fast neutron, but arriving at the detectors prior to the neutron due to the velocity difference between photons and fission neutrons. Upon detection of a fast neutron in the triggering detector D1, a time gate is opened for all other detectors. The length of this time gate will depend on the precise parameters of the embodiment: For example, an RPM using NaI detectors could have a background count rate of the order of 5'000 cps. As such the average time between gamma events is of the order of 200 us. Therefore, for a trigger gate length of 100 us, the probability of acquiring much background within this window is low. The gate length in this embodiment should account for the time necessary for fission neutrons to thermalize in order to be captured in an (n,gamma) reaction, or induce further fission in the SNM.

Time gating can equally be applied to other detectors, such as thermal neutron detectors, whereby the gate start time and gate width must be adjusted: The start time must be delayed sufficiently to allow for moderation of neutrons prior to detection by the thermal neutron detectors. Time gating can also be applied to the triggering detectors themselves, again with an adjusted gate start time and gate with, the configuration of which will depend on whether the triggering detectors are used to detect fast neutrons, gammas, thermal neutrons, or a combination of the above.

The triggering detectors D1 need not necessarily be fast neutron detectors. They can equally be thermal neutron detectors, whereby the disadvantage of a large time uncertainty due to thermalization of the order of 50 µs is introduced. Furthermore, the trigger arrives with a significant delay with respect to the gamma signatures of prompt fission gammas from the same fission event.

The triggering detectors D1 can also be gamma detectors, whereby the disadvantage of a high trigger rate and pile up arises. This can be remedied by only using events above certain energy, for example above 3.5 MeV as a trigger.

The data acquired from the radiation detectors D2 outside of the trigger gate serves to detect non-neutron-emitting radiological threats such as RDDs, as well as to update the background radiation data required for setting both RDD and SNM alarm thresholds. The updating of the background can be complimentary to other measures used for similar purposes, such as for example occupation sensors.

Occupation sensors may be used to determine whether a vehicle is present in an RPM which is part of the embodiment. Data taken without vehicle presence (truck 21 in FIG. 3) during or outside of the trigger gate of this invention can be used to update the macroscopic background. Data taken during vehicle presence but outside of the trigger gate of this invention can be used to update the microscopic background to account for effects such as shadow shielding of backgrounds by the vehicle.

Figure 4:
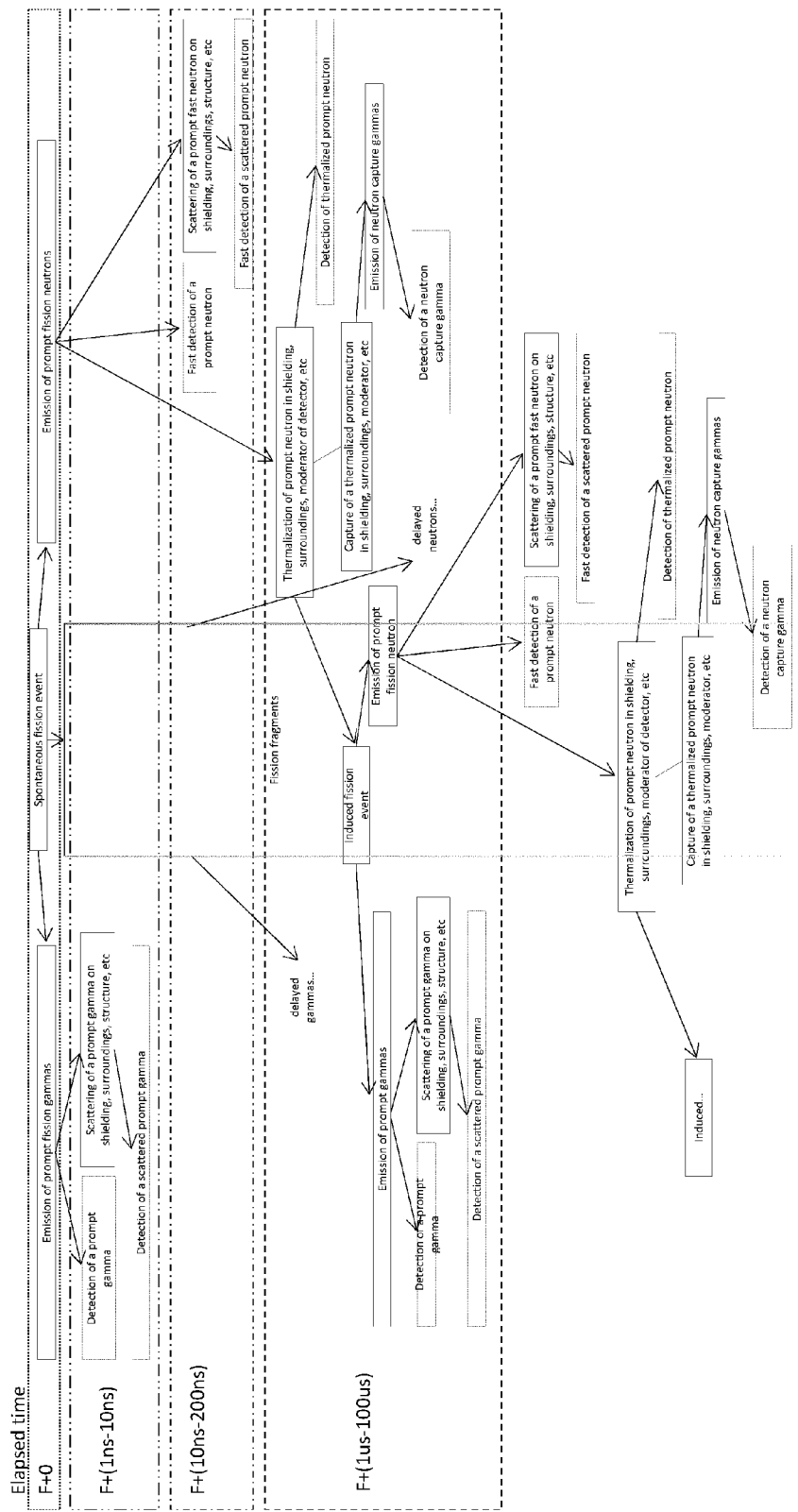
FIG. 4 shows a flow diagram of the physical processes that can lead to a time correlated signature of a fission event.

FIG. 4 shows a flow diagram of the physical processes that can lead to a time-correlated signature of a fission event. In chronological order, the first detectable signatures of a fission event are fission gammas, followed with a time delay of the order of tens of nanoseconds by fast fission neutrons detectable via fast neutron detectors. If fast neutron detection is used for system triggering, the trigger will only be created with a time delay with respect to the possible signals from fission gammas, therefore a delay line or similar means (delay unit 18 in FIG. 2) should be used to introduce a delay of the order of 100 ns to the gamma detector data stream. After creating a trigger, the fast neutron detector continues to wait for further detection events, in which case further triggers are created.

Over the time period of tens to hundreds of microseconds, fission neutrons will thermalize through scattering processes. Some of these neutrons will be scattered back into the SNM (source 11) where they can induce further fission events. Some fission neutrons will not make their way out through possibly present shielding 12 around the SNM, and will suffer neutron capture reaction in the shielding. In such (n, gamma) reactions on typical shielding materials such a hydrogen, nitrogen, steel, etc. high energy gammas are emitted, capable of penetrating to the outside to the detector. Yet other fission neutrons will thermalize outside the container, and suffer (n,gamma) processes in the surroundings 13. Further fission neutrons (n4, n5) will make it to the detector system. Some of these may be detected by the system's thermal neutron detectors (if the system is equipped with such). Others may suffer (n, gamma) processes in materials of which the system is made up (such as steel, PVC, PE) and be detected by gamma detectors of the system. It has been shown in the reference cited before, that surrounding gamma detectors with appropriate materials (such as PE and PVC) substantially increases the detected signal, either by the process described above or by moderation on these materials and a subsequent (n, gamma) reaction with the materials constituting the gamma detector (such as I in NaI or H in PVT).

The fission fragments created in the fission process will continue to emit neutron and gamma radiation in time correlation with the original fission event, thereby further contributing to the detectable signature.

Figure 6:
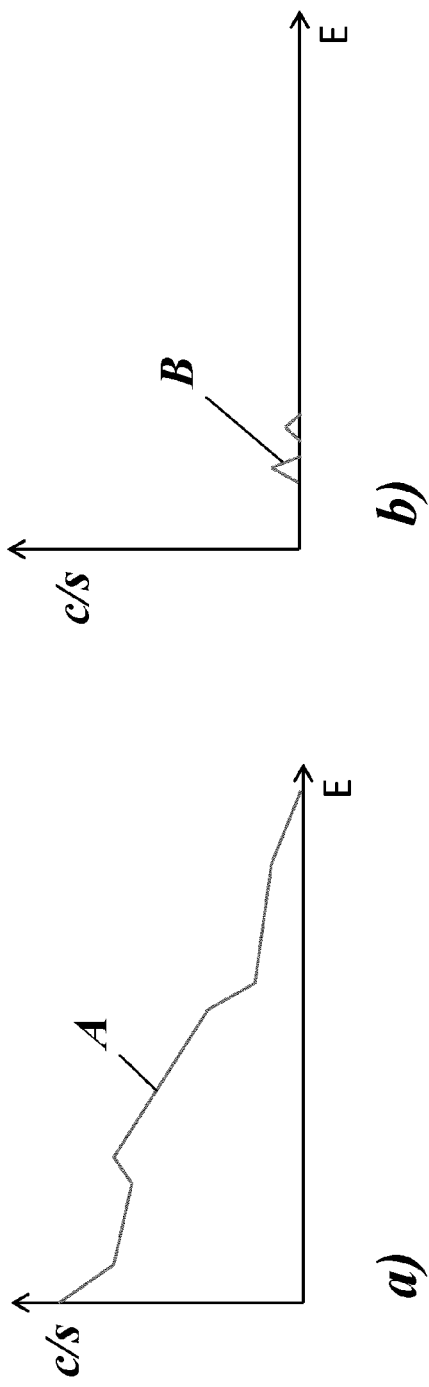
FIG. 6 shows notional response spectra of a notional gamma detector to a) background, b) SNM, c) SNM with background present, and d) SNM with background present but with background suppressed by an embodiment of this invention.

FIG. 6 shows the benefit of this invention in notional manner: Gamma detectors such as PVT or scintillation crystals show a response to the background of gamma radiation created by sources other than actual SNM sources. FIG. 6a) shows the notional response of a gamma detector to such background (curve A). Typical gamma detectors will detect background gammas at a rate of few thousand counts per second (c/s). Depending on the type of detector used, individual peaks in the background spectrum may or may not be resolved. FIG. 6b) shows the notional response of the same gamma detector exposed only to SNM in a hypothetical situation where no gamma background is present. All SNM emits copious quantities of gamma radiation (curve B), none the less it is difficult to detect as will become clear in the next paragraph.

FIG. 6c) shows the notional response of the same gamma detector exposed to SNM in the normal situation where the SNM signatures B is superposed with the far more intense gamma background response A. All SNM emits copious quantities of gamma radiation, but unfortunately in energy ranges where such signals are easily overshadowed by background A. Furthermore, a significant amount of the gamma radiation emitted by SNM has low energy; therefore it suffers strong attenuation if high-Z shielding surrounds the source.

FIG. 6d) shows the notional response of the same gamma detector exposed to SNM and gamma background, but the detector is operated as part of the setup and method described in this invention. The gamma detector is gated by the detection of fast neutrons from fission. The gate is open for brief moments when a) the SNM source is close enough to the source is for the signal to be close to its intensity maximum, and b) the probability of signals correlated to the triggering signal is high. In this manner, the background is substantially reduced (curve $A_r$), allowing increased threat sensitivity and lower nuisance alarm rates.

The detectors suitable for use include PVT, liquid scintillators, gas scintillators, proportional counters, crystal scintillators such as NaI, solid-state radiation detectors such as CZT, and/or thermal neutron detectors such as He-3, BF3, Li-6, or boron lined B-10+ZnS(Ag) detectors. In one embodiment of the invention, the system has a smaller form factor than an RPM and is a relocatable, portable, or even handheld device.

In another embodiment of the invention, the system uses only one type of detectors for triggering and detection, rather than a plurality of detectors.

In another embodiment of this invention, an additional second radiation source (23 in FIG. 2) is used to induce correlated radiation emission in a target (source 11). An example of such an embodiment includes an active interrogation configuration whereby a neutron or photon source induces fission in SNM, and the present invention is used to detect fission signatures above other backgrounds. In another embodiment of this invention, natural muon radiation is used for this purpose, for example with a muon tomography device used as part of the embodiment.

In another embodiment of the invention, fast neutron detectors are used to gate thermal neutron detectors, thereby achieving directionality. In another embodiment of the invention the time differences between signals is used to gain information about the likely location of the source or about the likely nature of the source.

In another embodiment of the invention, special materials are used as part of the setup to increase the secondary signatures. Such materials include Gd (which has a high cross section for (n, gamma) reactions and is available as a salt that can be dissolved in water serving as a moderator), PE (which is an effective moderator and contains H capable of causing (n, gamma) reactions), and PVC (which is an effective moderator and contains Cl capable of causing (n, gamma) reactions).

The invention claimed is:

1. A method for obtaining information signatures from nuclear material or about the presence, the nature or the shielding of a nuclear material, said nuclear material emitting in a time or angle correlated manner at least a first radiation and a second radiation, said method comprising the steps of detecting said first radiation with at least one first radiation detector and detecting said second radiation with at least one second radiation detector wherein the detection of said second radiation is triggered by said detection of said first radiation in a manner that is adapted to the radiation's correlation structure, thereby increasing the signal-to-background ratio for the detection of said second radiation.

2. The method according to claim 1, wherein said first radiation detector detects low background fission signatures comprising radiation of comparatively low abundance except in the presence of nuclear material, and said second radiation detector detects any fission signatures directly or indirectly associated with nuclear material and difficult to use otherwise for characterization due to the presence of an intense background.

3. The method according to claim 2, wherein said first radiation detector detects neutron radiation or high energy gamma radiation including radiation energy between 3 MeV and 9 MeV, and said second radiation detector detects gamma or x-ray radiation including radiation energy below 3.5 MeV.

4. The method according to claim 2, wherein said first radiation detector comprises a design that minimizes unintended triggers of said second radiation detector, which is achieved by maximizing said first radiation detector's sensitivity to said low background fission signatures, and minimizing said first radiation detector's sensitivity to the background.

5. The method according to claim 4, wherein said first radiation detector is insensitive to photons of an energy below 3 MeV.

6. The method according to claim 4, wherein said first radiation detector is a gas-based detector using a gas with low mass and low number of electrons, thereby making it insensitive to photons while being sensitive to neutrons.

7. The method according to claim 6, wherein said first radiation detector uses He-4 as said gas.

8. The method according to claim 2, wherein said first radiation detector detects low background fission signatures comprising radiation resulting directly from fission or indirectly through neutron capture, or inelastic scattering, or fission processes in a material within range of fission neutrons from said nuclear material.

9. The method according to claim 2, wherein said second radiation detector detects gamma or x-ray radiation emitted directly by fission or in indirect processes as a consequence thereof.

10. The method according to claim 1, wherein said first radiation detector detects single events, and the detection events of said first radiation detector define one or more predetermined time windows, the data being acquired by one or more second radiation detectors within said predetermined time windows being analyzed separately from data acquired by said second radiation detector outside said time window.

11. The method according to claim 10, wherein at least one of said predetermined time windows opens at a start time within hundreds of nanoseconds prior to the triggering event detected by said first radiation detector, and the data being acquired by said second radiation detector are delayed accordingly.

12. The method according to claim 11, wherein said first radiation detector is a fast neutron detector and said second radiation detector is a gamma detector.

13. The method according to claim 11, wherein said first and second radiation detectors are both either fast neutron or gamma detectors, or wherein at least one of said first and second radiation detectors is both a fast neutron detector and a gamma detector.

14. The method according to claim 10, wherein at least one of said predetermined time windows opens at a start time within tens of nanoseconds prior to the triggering event detected by said first radiation detector, and the data being acquired by said second radiation detector are delayed accordingly.

15. The method according to claim 10, wherein at least one of said predetermined time windows opens at a start time within a hundred microseconds prior to the triggering event detected by said first radiation detector, and the data being acquired by said second radiation detector are delayed accordingly.

16. The method according to claim 10, wherein at least one of said predetermined time windows closes at an end time within hundreds of microseconds after the triggering event detected by said first radiation detector, to allow for the thermalization of neutrons thereby increasing the sensitivity to gammas and neutrons from induced events the induced events comprising induced fission or (n, gamma) reactions.

17. The method according to claim 16, wherein the length of said predetermined time windows is adapted in case of high count rates of the radiation detectors or in order to optimize the signal-to-noise ratio.

18. The method according to claim 10, wherein the predetermined time windows are adjusted to account for other time correlation structures of physical processes creating the signatures, or physical processes involved in detecting said signatures.

19. The method according to claim 10, wherein data acquired during said predetermined time windows is used to detect the presence of or characterize special nuclear material (SNM).

20. The method according to claim 1, wherein said second radiation detector is a thermal neutron detector exploiting the neutron capture of materials, the materials comprising one or more of He-3, Li-6, or B-10, or a detector for neutrons or gamma radiation, comprising one or more of a PVT, a liquid scintillator, a sodium iodide scintillation crystal, and a solid state detector.

21. The method according to claim 1, wherein said nuclear material is activated to emit said correlated radiation by neutrons, photons, muons or protons from an internal or external source as part of an interrogation process.

22. A measurement setup for performing a method for obtaining information signatures from nuclear material or about the presence, the nature or the shielding of a nuclear material, the setup comprising at least a first radiation detector for detecting a first radiation emitted by a nuclear radiation source, and at least a second radiation detector for detecting a second radiation emitted by said nuclear radiation source in a time or angle correlated manner with said first radiation, wherein said first radiation detector is connected to and configured to trigger said second radiation detector in a manner that is adapted to the radiation's correlation structure.

23. The measurement setup according to claim 22, wherein said first and second detectors are each connected to a measuring unit.

24. The measurement setup according to claim 23, wherein a signal delay unit is provided between said second radiation detector and said measuring unit.

25. The measurement setup according to claim 22, wherein said first radiation detector is a fast neutron detector and said second radiation detector is a gamma detector.

26. The measurement setup according to claim 25, wherein said first radiation detector is a gas-based detector with the capability of rejecting events caused by gamma radiation or with a low mass and low number of electrons, thereby making it insensitive to photons while being sensitive to neutrons.

27. The measurement setup according to claim 26, wherein said first radiation detector uses He-4 as said gas.

28. The measurement setup according to claim 22, wherein said second radiation detector is part of a radiation portal monitor for monitoring pedestrians, vehicles, or containers.

29. The measurement setup according to claim 22, wherein said first radiation detector is hand-held or otherwise maneuverable to an area of interest.

* * * * *

UNITED STATES PATENT AND TRADEMARK OFFICE
CERTIFICATE OF CORRECTION

| | | |
|---|---|---|
| PATENT NO. | : 9,477,005 B2 | Page 1 of 1 |
| APPLICATION NO. | : 14/350485 | |
| DATED | : October 25, 2016 | |
| INVENTOR(S) | : Rico Chandrasekharan et al. | |

It is certified that error appears in the above-identified patent and that said Letters Patent is hereby corrected as shown below:

In the Claims

Column 9, Line 24, Claim 1, after "of" insert -- : --

Column 10, Line 45, Claim 16, after "events" insert -- , --

Signed and Sealed this
Fourteenth Day of February, 2017

Michelle K. Lee
*Director of the United States Patent and Trademark Office*